(12) United States Patent
Kobayashi et al.

(10) Patent No.: US 7,538,048 B2
(45) Date of Patent: May 26, 2009

(54) LASER BEAM PROCESSING MACHINE

(75) Inventors: Satoshi Kobayashi, Tokyo (JP); Keiji Nomaru, Tokyo (JP); Yosuke Watanabe, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/808,384

(22) Filed: Jun. 8, 2007

(65) Prior Publication Data

US 2007/0243696 A1 Oct. 18, 2007

Related U.S. Application Data (62) Division of application No. 11/242,015, filed on Oct. 4, 2005, now abandoned.

(30) Foreign Application Priority Data

Oct. 7, 2004 (JP) ............... 2004-294743

(51) Int. Cl.
*H01L 21/00* (2006.01)
(52) U.S. Cl. ............... 438/795; 257/E21.134; 257/E21.347
(58) Field of Classification Search ........... 438/795
See application file for complete search history.

(56) References Cited

U.S. PATENT DOCUMENTS

| | | | |
|---|---|---|---|
| 6,211,488 B1 | 4/2001 | Hoekstra et al. | |
| 6,459,071 B2 | 10/2002 | Schluter | |
| 2002/0088782 A1 | 7/2002 | Morita | |
| 2002/0141473 A1 | 10/2002 | Cordingley et al. | |
| 2005/0006361 A1 | 1/2005 | Kobayashi et al. | |

FOREIGN PATENT DOCUMENTS

| | | |
|---|---|---|
| JP | 3-13290 | 1/1991 |
| JP | 2002-273592 | 9/2002 |
| JP | 2002-192370 | 10/2002 |
| JP | 3408805 | 3/2003 |
| JP | 2004-34120 | 2/2004 |
| JP | 2005-28438 | 2/2005 |
| JP | 2005-161330 | 6/2005 |

*Primary Examiner*—W. David Coleman
(74) *Attorney, Agent, or Firm*—Smith, Gambrell & Russell, LLP (57) ABSTRACT

A laser beam processing machine comprising a path distribution means for distributing a pulse laser beam oscillated by pulse laser beam oscillation means to a first path and a second path alternately, and one laser beam that passes through one of the paths and is converged by one condensing lens and the other laser beam that passes through the other path and is converged by the condensing lens are applied at different focusing points which have been displaced from each other in the direction of the optical axis, alternately with a time lag between them.

6 Claims, 6 Drawing Sheets

LASER BEAM PROCESSING MACHINE

This application is a division of U.S. patent application Ser. No. 11/242,015, filed Oct. 4, 2005, now abandoned which claims the benefit of JP 2004-294743, both of which are herein incorporated by reference.

FIELD OF THE INVENTION

The present invention relates to a laser beam processing machine for applying a pulse laser beam capable of passing through a workpiece to form a deteriorated layer in the inside of the workpiece.

DESCRIPTION OF THE PRIOR ART

In the production process of a semiconductor device, a plurality of areas are sectioned by dividing lines called "streets" arranged in a lattice pattern on the front surface of a wafer comprising a suitable substrate such as a silicon substrate, sapphire substrate, silicon carbide substrate, lithium tantalite substrate, glass substrate or quartz substrate, and a circuit (function element) such as IC or LSI is formed in each of the sectioned areas. Individual semiconductor devices are manufactured by cutting the wafer along the dividing lines to divide it into the areas each having a circuit formed thereon. To divide the wafer, there are proposed various methods making use of a laser beam.

U.S. Pat. No. 6,211,488 and Japanese Patent No. 3408805 disclose a wafer dividing method comprising the steps of converging a pulse laser beam in an intermediate portion in the thickness direction of a wafer and moving the pulse laser beam and the wafer relative to each other along dividing lines to form a deteriorated layer in the intermediate portion in the thickness direction of the wafer along the dividing lines, and exerting external force to the wafer to divide it along the deteriorated layers.

It is, however, conceivable not only that the deteriorated layer is formed in the intermediate portion in the thickness direction of the water but also that the deteriorated layer is formed along the dividing lines in a portion from the back surface up to a predetermined depth or from the front surface to a predetermined depth in place of the intermediate portion in the thickness direction or in addition thereto. In either case, to divide the wafer along the dividing lines precisely by exerting external force to the wafer, the thickness of the deteriorated layer, that is, the size of the deteriorated layer in the thickness direction of the wafer must be made relatively large. Since the thickness of the deteriorated layer is 10 to 50 μm near the focusing point of a pulse laser beam, when the thickness of the deteriorated layer is to be increased, the pulse laser beam and the wafer must be moved relative to each other along each dividing line repeatedly by changing the position of the focusing point of the pulse laser beam in the thickness direction of the wafer. Therefore, in the case where the wafer is relatively thick, it takes long to form the deteriorated layer thick enough to divide the wafer precisely.

To solve the above problem, the applicant previously proposed a laser beam processing machine, which was so constituted as to allow a pulse laser beam to converge at at least two focusing points that have been displaced from each other in the direction of its optical axis as Japanese Patent Application No. 2003-273341. With this laser beam processing machine, deteriorated layers can be formed at positions of at least two focusing points, which are displaced from each other in the thickness direction of a workpiece, that is, a wafer at the same time. However, as this laser beam processing machine applies a laser beam with its focusing points displaced from each other on the same optical axis in the thickness direction of the wafer, a laser beam having a shallow focusing point obstructs the application of a laser beam having a deep focusing point, there by making it impossible to form a desired deteriorated layer.

SUMMARY OF THE INVENTION

It is an object of the present invention to provide a laser beam processing machine which has a constitution of a laser beam having a deep focusing point being not obstructed by the other laser beam having a shallow focusing point, even when a laser beam is converged at two focusing points which are displaced from each other on the same optical axis,.

To attain the above object, according to the present invention, there is provided a laser beam processing machine comprising a chuck table for holding a workpiece and a laser beam application means for applying a pulse laser beam capable of passing through the workpiece to the workpiece held on the chuck table, the laser beam application means comprising a pulse laser beam oscillation means and a transmitting/converging means including an optical transmission means for transmitting a pulse laser beam oscillated by the pulse laser beam oscillation means and having one condensing lens for converging the pulse laser beam transmitted by the optical transmission means, wherein the optical transmission means comprises a path distribution means for distributing the pulse laser beam oscillated by the pulse laser beam oscillation means to a first path and a second path alternately, a plurality of mirrors and a beam splitter for putting together the optical axis of a laser beam that has been distributed by the path distribution means and passes through the first path and the optical axis of a laser beam that has been distributed by the path distribution means and passes through the second path again and a focusing point depth displacing means that is arranged in any one path of the first path and the second path, and displaces the focusing point of one of the laser beams, which have passed through the one path and is converged by one condensing lens, in the direction of the optical axis; and one laser beam that passes through one of the paths and is converged by the condensing lens and the other laser beam that passes through the other path and is converged by the condensing lens are applied at different focusing points which have been displaced from each other in the direction of the optical axis, alternately with a time lag between them.

The above path distribution means has a polarization conversion means for dividing the pulse laser beam oscillated by the pulse laser beam oscillation means into vertically polarized light and horizontally polarized light alternately and a beam splitter for distributing the vertically polarized laser beam and the horizontally polarized laser beam obtained by the polarization conversion means to the first path and the second path. The polarization conversion means comprises a modulator for dividing the pulse laser beam oscillated by the pulse laser beam oscillation means into horizontally polarized light and vertically polarized light alternately and a pulse generator for providing a sync signal for setting a repetition frequency (f) to the pulse laser beam oscillation means and a sync signal having a frequency (f)/2 to the modulator. The modulator for dividing the pulse laser beam into horizontally polarized light and vertically polarized light alternately is composed of a modulation element making use of an electro-optic effect.

The above path distribution means comprises a modulator for distributing the pulse laser beam oscillated by the pulse laser beam oscillation means to a first path and a second path alternately and a pulse generator for providing a sync signal for setting a repetition frequency (f) to the pulse laser beam oscillation means and a sync signal having a frequency (f)/2 to the modulator. The modulator for distributing the pulse laser beam to two paths alternately is composed of a modulation element making use of an acoustic-optic effect.

The above focusing point depth displacing means changes the beam divergent angle of the pulse laser beam.

Since the laser beams distributed to the first path and the second path by the path distribution means are output alternately in the laser beam processing machine of the present invention, they are converged in the inside of the workpiece with a time lag between them. Therefore, even when a laser beam passing through the first path and a laser beam passing through the second path are converged at focusing points which are displaced from each other on the optical axis, the laser beam having a deep focusing point is not obstructed by the other laser beam having a shallow focusing point.

DETAILED DESCRIPTION OF THE PREFERRED EMBODIMENT

Preferred embodiments of a laser beam processing machine constituted according to the present invention will be described in detail with reference to the accompanying drawings.

Figure 1:
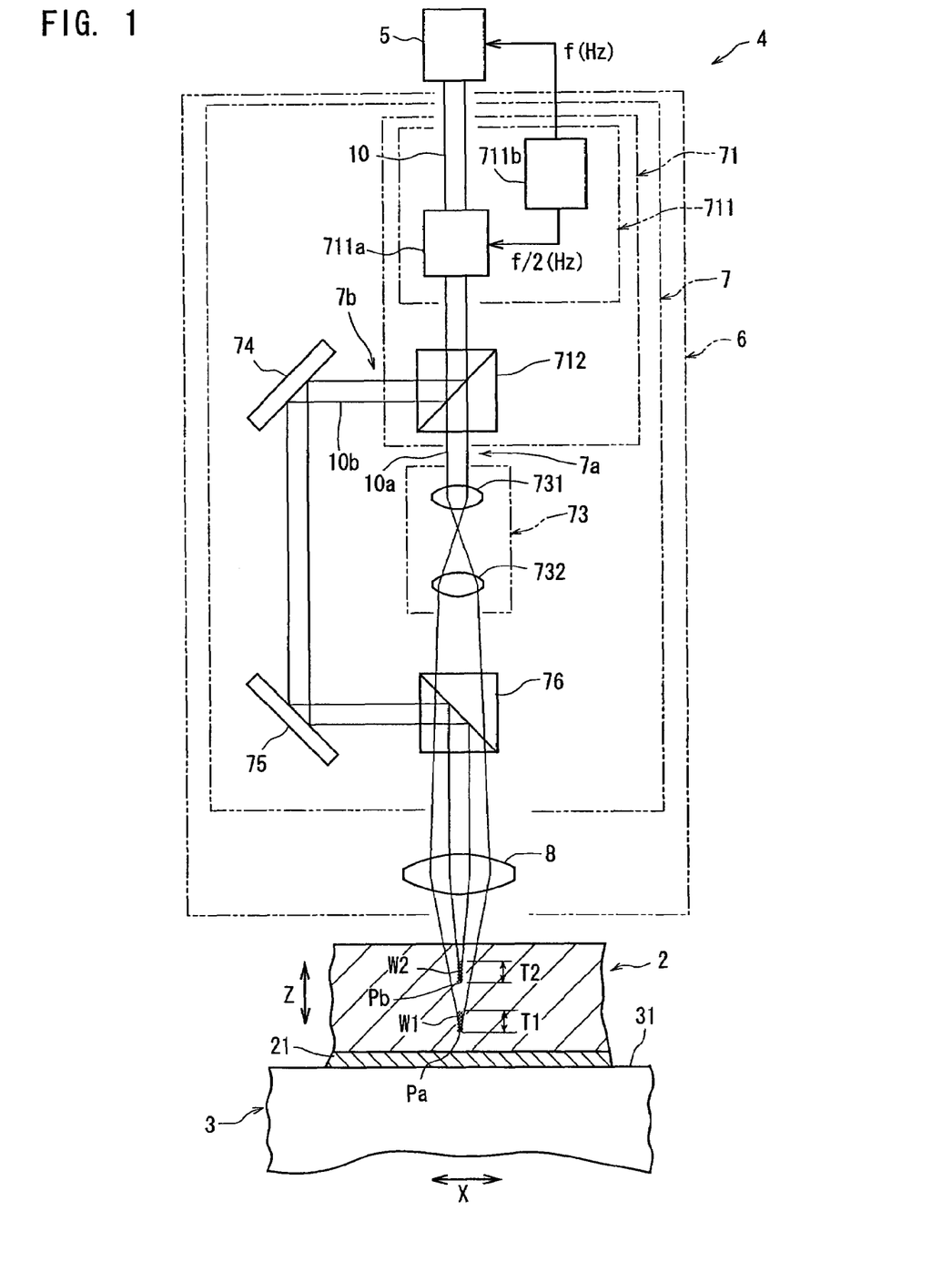
FIG. 1 is a schematic constitution diagram of a first embodiment of the laser beam processing machine constituted according to the present invention.

FIG. 1 is a schematic diagram of a first embodiment of a laser beam processing machine constituted according to the present invention. The illustrated machine comprises a chuck table 3 for holding a wafer 2 as a workpiece and a laser beam application means denoted by 4.

The chuck table 3 comprises an adsorption chuck 31 made from a porous member or having a plurality of suction holes or grooves, and the adsorption chuck 31 is communicated with a suction means that is not shown. Therefore, a protective tape 21 affixed to the side of a surface on which a circuit is formed, of the wafer 2 as the workpiece is placed on the adsorption chuck 31, and the wafer 2 is suction-held on the chuck table 3 by activating the suction means that is not shown. The thus constituted chuck table 3 is so constituted as to be moved in a processing-feed direction indicated by an arrow X in FIG. 1 by a processing-feed means that is not shown. Therefore, the chuck table 3 and the laser beam application means 4 can move relative to each other in the processing-feed direction indicated by the arrow X.

The laser beam application means 4 comprises a pulse laser beam oscillation means 5 and a transmitting/converging means 6 for transmitting and converging a pulse laser beam oscillated by the pulse laser beam oscillation means 5. The pulse laser beam oscillation means 5 oscillates a pulse laser beam 10 capable of passing through the wafer 2 as the workpiece. As this pulse laser beam oscillation means 5 may be used a YVO4 pulse laser beam oscillator or YAG pulse laser oscillator for oscillating the pulse laser beam 10 having a wavelength of 1,064 nm, for example, when the wafer 2 is a wafer comprising a silicon substrate, silicon carbide substrate, lithium tantalite substrate, glass substrate or quartz substrate.

Description will be continued with reference to FIG. 1. The transmitting/converging means 6 of the laser beam application means 4 is interposed between the pulse laser beam oscillation means 5 and the wafer 2 as the workpiece held on the chuck table 3. The transmitting/converging means 6 in the illustrated embodiment comprises an optical transmission means 7 for transmitting the pulse laser beam oscillated by the pulse laser beam oscillation means 5 and a condensing lens 8 such as an objective lens for converging pulse laser beams transmitted by the optical transmission means 7. The optical transmission means 7 comprises a path distribution means 71 for distributing the pulse laser beam oscillated by the pulse laser beam oscillation means 5 to a first path 7a and to a second path 7b alternately. This path distribution means 71 comprises a polarization conversion means 711 for dividing the pulse laser beam oscillated by the pulse laser beam oscillation means 5 into vertically polarized light and horizontally polarized light alternately, and a beam splitter 712 for dividing the vertically polarized beam and the horizontally polarized beam divided by the polarization conversion means 711 into the first path 7a and the second path 7b, respectively. The polarization conversion means 711 comprises a modulator 711a for dividing the pulse laser beam oscillated by the pulse laser beam oscillation means 5 into vertically polarized light and horizontally polarized light alternately and a pulse generator 711b for providing a sync signal for setting a repetition frequency (f) to the pulse laser beam oscillation means 5 and a sync signal having a frequency (f)/2 to the modulator 711a. As the modulator 711a is used a modulation element making use of an electrooptic effect in the illustrated embodiment.

The optical transmission means 7 in the illustrated embodiment comprises a focusing point depth displacing means 73 arranged in the above first path 7a, and a first mirror 74, a second mirror 75 and a beam splitter 76 for aligning the optical axe of the vertically polarized laser beam and the optical axe of the horizontally polarized laser beam, which have been divided into the first path 7a and the second path 7b by the above beam splitter 712, with each other again. The above focusing point depth displacing means 73 is composed of two convex lenses 731 and 732 in the illustrated embodiment.

In the above-described laser beam processing machine, when a pulse laser beam having a repetition frequency f (Hz) is to be oscillated from the pulse laser beam oscillation means 5, a sync signal for setting a repetition frequency (f) is provided from the pulse generator 711b of the polarization conversion means 711 to control the repetition frequency (f) of the pulse laser beam oscillated by the pulse laser beam oscillation means 5. At the same time, the pulse generator 711b provides a sync signal having a frequency (f)/2 to the modulator 711a in response to the signal, which serves as a trigger, provided to the pulse laser beam oscillation means 5. As a result, the pulse laser beam 10 oscillated from the pulse laser beam oscillation means 5 is divided into vertically polarized light and horizontally polarized light alternately when it passes through the modulator 711*a* that is composed of a modulation element making use of an electro-optic effect (in the case where polarization at the time of emitting a laser beam is linearly polarized light). As for the division of the vertically polarized light and the horizontally polarized light by the polarization conversion means 711, for example, two continuous pulses may be divided as vertically polarized light and the subsequent two continues pulses may be divided as horizontally polarized light alternately.

The vertically polarized light and the horizontally polarized light divided by the modulator 711*a* of the polarization conversion means 711 alternately are distributed to a vertically polarized laser beam 10*a* and a horizontally polarized laser beam 10*b* by the beam splitter 712, respectively. That is, the vertically polarized laser beam 10*a* passes through the beam splitter 712 to go straight to the first path 7*a* while the horizontally polarized laser beam 10*b* is reflected by the beam splitter 712 to change its direction substantially at a right angle to the second path 7*b*. The vertically polarized laser beam 10*a* going straight to the first path 7*a* passes through the two convex lenses 731 and 732 of the focusing point depth displacing means 73 to change its beam divergent angle. In the illustrated embodiment, its beam diameter gradually increases as it becomes farther away from the convex lens 732, on a downstream side, constituting the focusing point depth displacing means 73. The vertically polarized laser beam 10*a* whose beam divergent angle has been changed by passing through the focusing point depth displacing means 73 passes through the beam splitter 76 and is converged at a focusing point Pa in the inside of the wafer 2 as the workpiece by the objective condensing lens 8. Since the vertically polarized laser beam 10*a* going straight to the first path 7*a* is converged by the condensing lens 8 in a state where its beam diameter is gradually increased by passing through the focusing point depth displacing means 73, its focusing point Pa is locate data position (i.e., lower position in FIG. 1) deeper than the focusing point Pb which will be described later, of the horizontally polarized laser beam 10*a* passing through the second path 7*b*, that is, a position away from the condensing lens 8 in the direction of the optical axis. The depth of this focusing point Pa can be suitably adjusted by moving the convex lens 731 or 732 as the focusing point depth displacing means 73 in the direction of the optical axis.

Meanwhile, the horizontally polarized laser beam 10*b* branched off to the second path 7*b* by the beam splitter 712 is reflected by the first mirror 74, the second mirror 75 and the beam splitter 76 to change its direction substantially at a right angle, and its optical axis is aligned with the optical axis of the vertically polarized laser beam 10*a* passing through the above first path 7*a*. The horizontally polarized laser beam 10*b* whose optical axis has been thus aligned with the optical axis of the vertically polarized laser beam 10*a* is converged at the focusing point Pb in the inside of the wafer 2 as the workpiece by the condensing lens 8. As shown in FIG. 1, the focusing point Pb of the horizontally polarized laser beam 10*b* is located at a position (upper position in FIG. 1) shallower than the focusing point Pa, that is, a position close to the condensing lens 8 on the same optical axis as that of the focusing point Pa of the above vertically polarized laser beam 10*a*.

Since the above vertically polarized laser beam 10*a* and the above horizontally polarized laser beam 10*b* are output alternately by the modulator 711*a* of the above polarization conversion means 711, they are converged in the inside of the wafer 2 as the workpiece with a time lag between their pulses. Therefore, the vertically polarized laser beam 10*a* and the horizontally polarized laser beam 10*b* do not interfere with each other, and the vertically polarized laser beam 10*a* having a deep focusing point is not obstructed by the horizontally polarized laser beam 10*b* having a shallow focusing point. As a result, deteriorated layers W1 and W2 having desired thicknesses T1 and T2 can be formed near the focusing point Pa of the vertically polarized laser beam 10*a* and the focusing point Pb of the horizontally polarized laser beam 10*b*, generally, in areas from the focusing point Pa and the focusing point Pb toward an upward direction at the same time, respectively. The deteriorated layers formed in the wafer 2 as the workpiece are generally molten and re-solidified (that is, molten when the vertically polarized laser beam 10*a* and the horizontally polarized laser beam 10*b* are converged and then, re-solidified after the convergence of the vertically polarized laser beam 10*a* and the horizontally polarized laser beam 10*b*), namely, are in a state of voids or cracks, though this depends on the material of the wafer 2 or the intensities of the converged vertically polarized laser beam 10*a* and the converged horizontally polarized laser beam 10*b*. The time lag between the time when the vertically polarized laser beam 10*a* reaches the focusing point Pa and the time when the horizontally polarized laser beam 10*b* reaches the focusing point Pb is (1 second/repetition frequency). As for the vertically polarized laser beam 10*a* and the horizontally polarized laser beam 10*b* which are converged alternately, it is desired that the vertically polarized laser beam 10*a* whose focusing point is away from the condensing lens 8 should be converged before the horizontally polarized laser beam 10*b* whose focusing point is close to the condensing lens 8.

Figure 2:
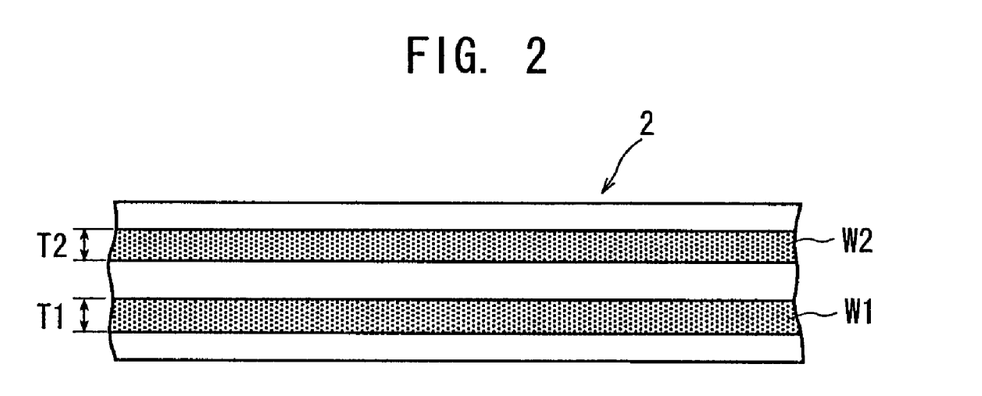
FIG. 2 is a diagram showing a state where two deteriorated layers are formed in the inside of a workpiece by the laser beam processing machine of FIG. 1 at the same time.

The laser beam processing machine in the illustrated embodiment moves the chuck table 3 (therefore, the water 2 as the workpiece held on the chuck table 3), for example, in a left direction in FIG. 1 while a pulse laser beam is applied as described above. As a result, two deteriorated layers W1 and W2 having thicknesses T1 and T2 are formed along a predetermined dividing line in the inside of the wafer 2 at the same time, as shown in FIG. 2. As described above, according to the laser beam processing machine in the illustrated embodiment, the deteriorated layers W1 and W2 having thicknesses T1 and T2 can be formed in two areas which are displaced from each other in the thickness direction of the wafer 2 as the workpiece, at the same time by using the single laser beam application means 4. When the deteriorated layers W1 and W2 are to be formed in the thickness direction continuously, the convex lens 731 or 732 as the focusing point depth displacing means 73 is moved in the direction of the optical axis, that is, in the vertical direction in FIG. 1 to shift the focusing point Pa of the vertically polarized laser beam 10*a* in an upward direction. The focusing point Pa is positioned lower than the focusing point Pb of the horizontally polarized laser beam 10*b* by the thickness T1.

The laser processing conditions are set as follows, for example.

Light source: LD excited Q switch Nd:YVO4 pulse laser
Wavelength: 1,064 nm
Pulse output: 2.5 µJ
Focusing spot diameter: 1 µm
Pulse width: 40 ns
Repetition frequency: 100 kHz
Processing-feed rate: 100 mm/sec When the wafer 2 as the workpiece is thick and hence, the deteriorated layers W1 and W2 having thicknesses T1 and T2 are not enough for dividing the wafer precisely along the dividing lines, the laser beam application means 4 and the chuck table 3 are moved relative to each other by a predetermined distance in the direction of the optical axis, that is, the vertical direction indicated by the arrow Z in FIG. 1. Thereby, the focusing point Pa and the focusing point Pb are displaced from each other in the direction of the optical axis, that is, in the thickness direction of the wafer 2 as the workpiece, and the chuck table 3 is moved in the processing-feed direction indicated by the arrow X in FIG. 1 while a pulse laser beam is applied from the laser beam application means 4. As a result, deteriorated layers W1 and W2 having thicknesses T1 and T2 can be formed in the wafer 2 as the workpiece at positions displaced in the thickness direction in addition to the above deteriorated layers W1 and W2.

A description is subsequently given of a second embodiment of the laser beam application means 4 with reference to FIG. 3.

Figure 3:
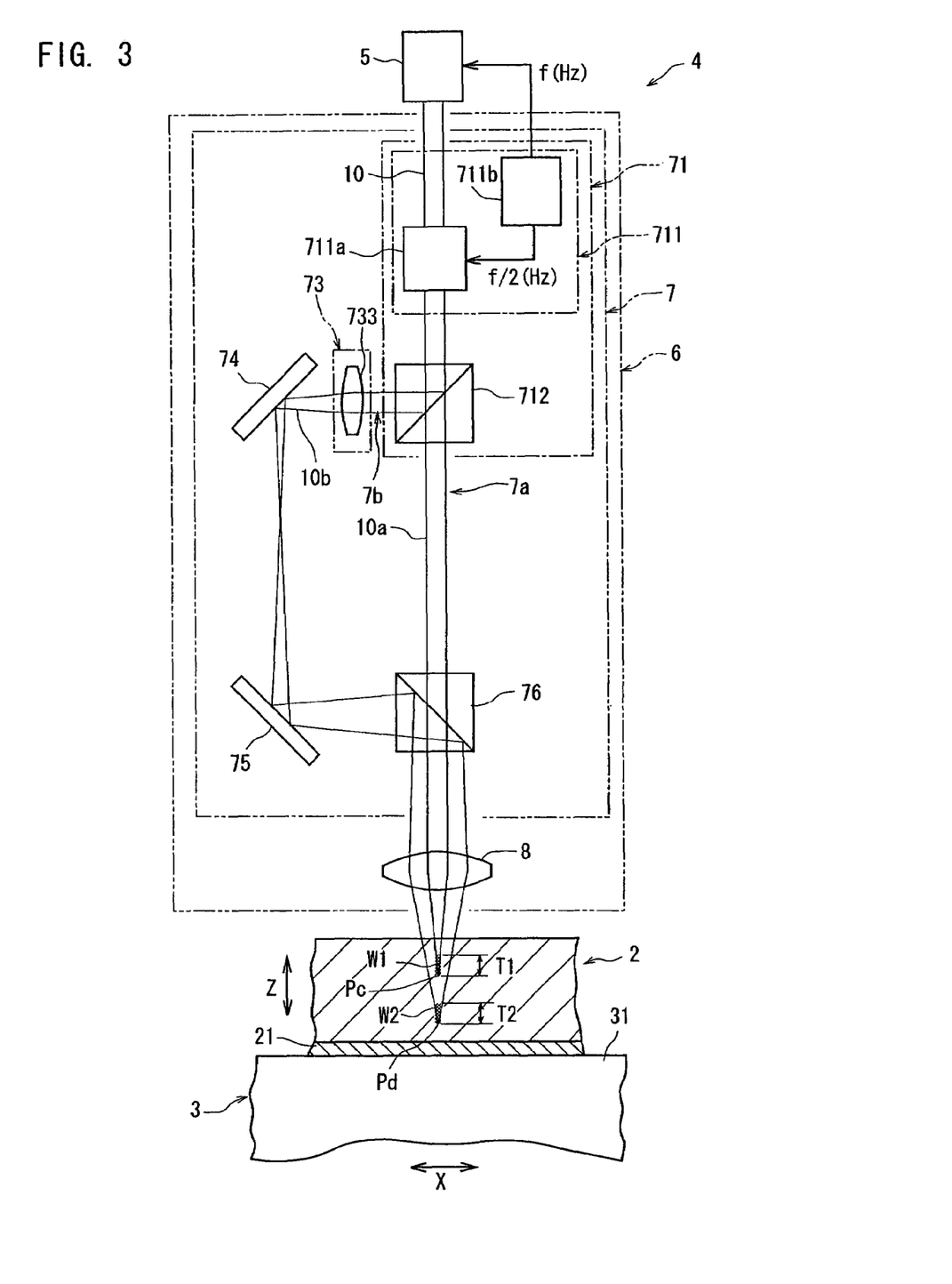
FIG. 3 is a schematic constitution diagram of a second embodiment of the laser beam processing machine constituted according to the present invention.

The laser beam application means 4 shown in FIG. 3 differs from the laser beam application means 4 shown in FIG. 1 in that the focusing point depth displacing means 73 is arranged in the second path 7b. This focusing point depth displacing means 73 is composed of one convex lens 733 and is interposed between the beam splitter 712 and the first mirror 74. Since the constitution of the laser beam application means 4 shown in FIG. 3 is substantially the same as that of the laser beam application means 4 shown in FIG. 1 except for the focusing point depth displacing means 73, the same members are given the same reference symbols and their descriptions are omitted.

In the laser beam application means 4 shown in FIG. 3, the vertically polarized light and the horizontally polarized light divided by the modulator 711a of the polarization conversion means 711 alternately are separated into the vertically polarized laser beam 10a and the horizontally polarized laser beam 10b by the beam splitter 712, respectively, like the laser beam application means 4 shown in FIG. 1. That is, the vertically polarized laser beam 10a passes through the beam splitter 712 to go straight to the first path 7a while the horizontally polarized laser beam 10b is reflected by the beam splitter 712 to change its direction substantially at a right angle to the second path 7b. The vertically polarized laser beam 10a going straight to the first path 7a passes through the beam splitter 76 to be converged at a focusing point Pc in the inside of the wafer 2 as the workpiece by the condensing lens 8. This focusing point Pc corresponds to the focusing point Pb of the horizontally polarized laser beam 10b in the above-described embodiment shown in FIG. 1.

Meanwhile, the horizontally polarized laser beam 10b branched off to the second path 7b by the beam splitter 712 passes through the convex lens 733 as the focusing point depth displacing means 73 to change its beam divergent angle. In the illustrated embodiment, after the horizontally polarized laser beam 10b passes through the convex lens 733, its divergent angle decreases so that its beam diameter gradually becomes smaller as it becomes farther away from the convex lens 733. The horizontally polarized laser beam 10b whose beam divergent angle has been changed by passing through the convex lens 733 is reflected by the first mirror 74, the second mirror 75 and the beam splitter 76 at angles corresponding to their installation angles, and its optical axis is aligned with the optical axis of the vertically polarized laser beam 10a passing through the first path 7a. Since the beam divergent angle of the horizontally polarized laser beam 10b incident on the condensing lens 8 has been changed by passing through the convex lens 733 as the above focusing point depth displacing means 73, its beam diameter has also been changed. And, the horizontally polarized laser beam 10b passing through the condensing lens 8 is converged at a focusing point Pd in the inside of the wafer 2 as the workpiece. As the horizontally polarized laser beam 10b passing through the second path 7b as described above is converged by the condensing lens 8 in a state where its beam diameter is gradually increased by passing through the focusing point depth displacing means 73, its focusing point Pd is located at a position (lower position in FIG. 3) deeper than the focusing point Pc of the vertically polarized laser beam 10a passing through the first path 7a, that is, at a position away from the condensing lens 8 in the direction of the optical axis. The depth of the focusing point Pd can be suitably adjusted by moving the convex lens 733 as the focusing point depth displacing means 73 in the horizontal direction. Since the vertically polarized laser beam 10a and the horizontally polarized laser beam 10b are output alternately by the modulator 711a of the above polarization conversion means 711 also in the embodiment shown in FIG. 3, they are converged in the inside of the wafer 2 as the workpiece with a time lag between them. Therefore, the vertically polarized laser beam 10a and the horizontally polarized laser beam 10b do not interfere with each other, and the horizontally polarized laser beam 10b having a deep focusing point is not obstructed by the vertically polarized laser beam 10a having a shallow focusing point. As a result, deteriorated layers W1 and W2 having desired thicknesses T1 and T2 can be formed near the focusing point Pc of the vertically polarized laser beam 10a and near the focusing point Pd of the horizontally polarized laser beam 10b substantially at the same time, respectively.

A description is subsequently given of a third embodiment of the laser beam application means 4 with reference to FIG. 4.

Figure 4:
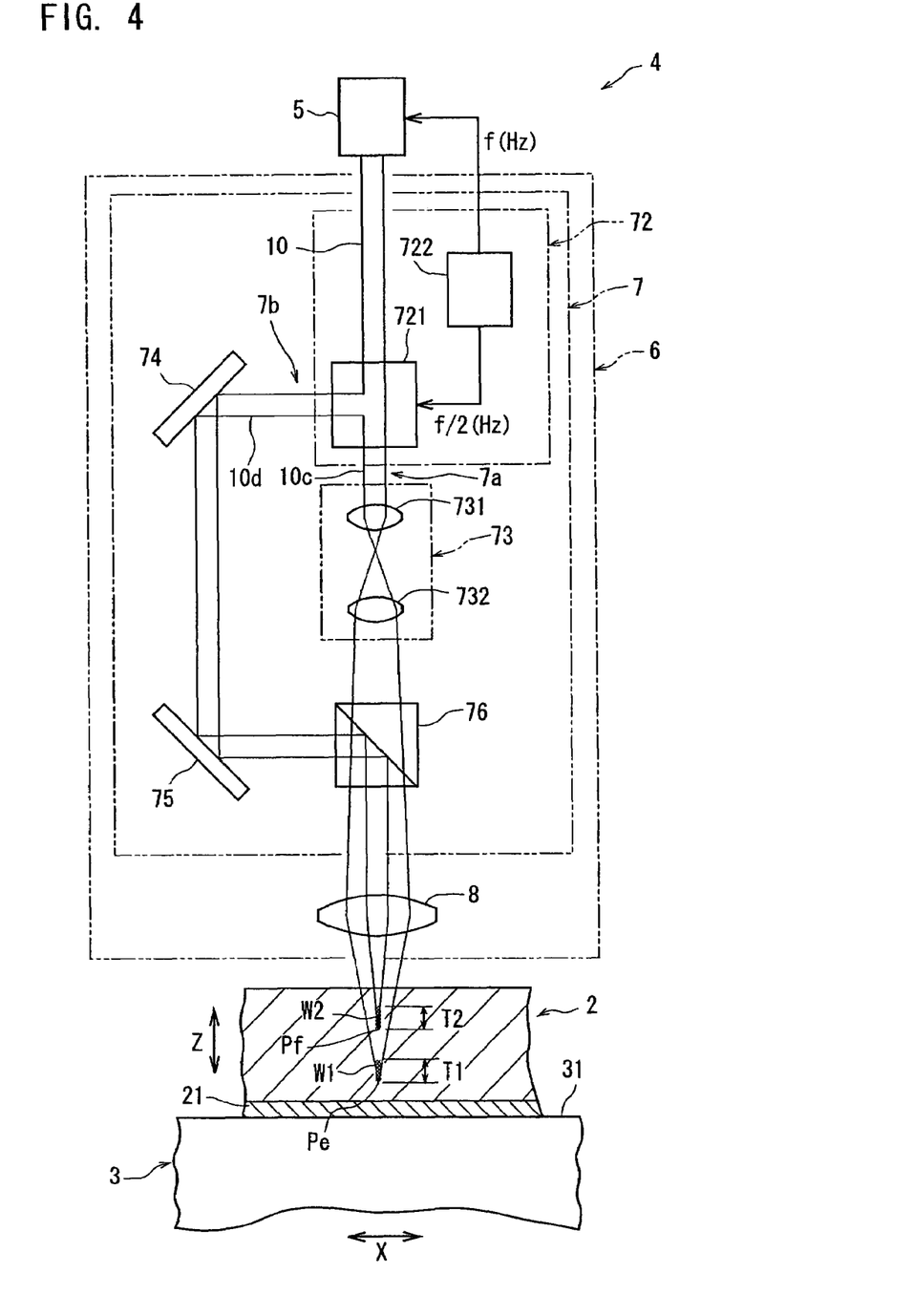
FIG. 4 is a schematic constitution diagram of a third embodiment of the laser beam processing machine constituted according to the present invention.

The laser beam application means 4 shown in FIG. 4 differs from the laser beam application means 4 shown in FIG. 1 in the path distribution means for distributing a pulse laser beam oscillated by the pulse laser beam oscillation means 5 to the first path 7a and the second path 7b alternately. That is, the path distribution means 72 in the embodiment shown in FIG. 4 is composed of a modulator 721 for dividing a pulse laser beam oscillated by the pulse laser beam oscillation means 5 into two different paths alternately and a pulse generator 722 for providing a sync signal for setting are petition frequency (f) to the pulse laser beam oscillation means 5 and a sync signal having a frequency (f)/2 to the modulator 721. As the modulator 721 is used a modulation element making use of an acoustic-optic effect in the illustrated embodiment. By providing this path distribution means 72, the beam splitter 712 in the laser beam application means 4 shown in FIG. 1 can be omitted. Since the constitution of the laser beam application means 4 shown in FIG. 4 is identical to that of the laser beam application means 4 shown in FIG. 1 except for the path distribution means 72, the same members are given the same reference symbols and their descriptions are omitted.

In the laser beam application means 4 shown in FIG. 4, when a pulse laser beam having a repetition frequency f(Hz) is to be oscillated from the pulse laser beam oscillation means 5, a sync signal for setting a repetition frequency (f) is given from the pulse generator 722 to control the repetition frequency (f) of the pulse laser beam oscillated from the pulse laser beam oscillation means 5. At the same time, the pulse generator 722 provides, to the modulator 721, a sync signal having a frequency (f)/2 in response to the signal, which serves as a trigger, provided to the pulse laser beam oscillation means 5. As a result, the pulse laser beams 10 oscillated from the pulse laser beam oscillation means 5 are divided into two different paths, that is, the first path 7a and the second path 7b alternately when it passes through the modulator 721 composed of a modulation element making use of an acoustic-optic effect. For example, odd-numbered pulse laser beams are divided into the first path 7a and even-numbered pulse laser beams are divided into the second path 7b. As for the distribution of the pulse laser beams by the path distribution means 72, two continuous pulses may be distributed to the first path 7a and the subsequent two continuous pulses may be distributed to the second path 7b alternately.

A first laser beam 10c distributed to the first path 7b by the modulator 721 of the path distribution means 72 passes through the two convex lenses 731 and 732 of the focusing point depth displacing means 73 to change its beam divergent angle. In the illustrated embodiment, its beam diameter is so designed as to gradually increase as it becomes farther away from the convex lens 732, on a downstream side, constituting the focusing point depth displacing means 73. The first laser beam 10c whose beam divergent angle has been changed by passing through the focusing point depth displacing means 73 passes through the beam splitter 76 and is converged at a focusing point Pe in the inside of the wafer 2 as the workpiece by the condensing lens 8. Since the first laser beam 10c going straight to the first path 7a is converged by the condensing lens 8 in a state where its beam diameter is gradually increased by passing through the focusing point depth displacing means 73, its focusing point Pe is located at a position (lower position in FIG. 1) deeper than the focusing point Pf of a second laser beam 10d which will be described later and passes through the second path 7b, that is, at a position away from the condensing lens 8 in the direction of the optical axis. The depth of the focusing point Pe can be suitably adjusted by moving the convex lens 731 or 732 as the focusing point depth displacing means 73 in the direction of the optical axis.

Meanwhile, the second laser beam 10d branched off to the second path 7b by the modulator 721 of the path distribution means 72 is reflected by the first mirror 74, the second mirror 75 and the beam splitter 76 to change its direction substantially at aright angle, and its optical axis is aligned with the optical axis of the first laser beam 10c passing through the first path 7a. Thus, the second laser beam 10d whose optical axis has been aligned with the optical axis of the first laser beam 10c is converged at a focusing point Pf in the inside of the wafer 2 as the work piece by the condensing lens 8. As shown in FIG. 4, the focusing point Pf of the second laser beam 10d is located at a position (upper position in FIG. 1) shallower than the focusing point Pe, that is, a position close to the condensing lens 8 on the same optical axis as the focusing point Pe of the above first laser beam 10c.

Since the above first laser beam 10c and the second laser beam 10d are output alternately by the modulator 721 of the above path distribution means 72, they are converged in the inside of the wafer 2 as the workpiece with a time lag between them. Therefore, the first laser beam 10c and the second laser beam 10d do not interfere with each other, and the first laser beam 10c having a deep focusing point is not obstructed by the second laser beam 10d having a shallow focusing point. As a result, deteriorated layers W1 and W2 having desired thicknesses T1 and T2 can be formed near the focusing point Pe of the first laser beam 10c and near the focusing point Pf of the second laser beam 10d, respectively. The time lag between the time when the first laser beam 10c reaches the focusing point Pe and the time when the second laser beam 10d reaches the focusing point Pf is (1 second/repetition frequency). As for the first laser beam 10c and the second laser beam 10d which are converged alternately, it is desired that the first laser beam 10c whose focusing point is away from the condensing lens 8 should be converged before the second laser beam 10d whose focusing point is close to the condensing lens 8.

A description is subsequently given of a fourth embodiment of the laser beam application means 4 with reference to FIG. 5.

Figure 5:
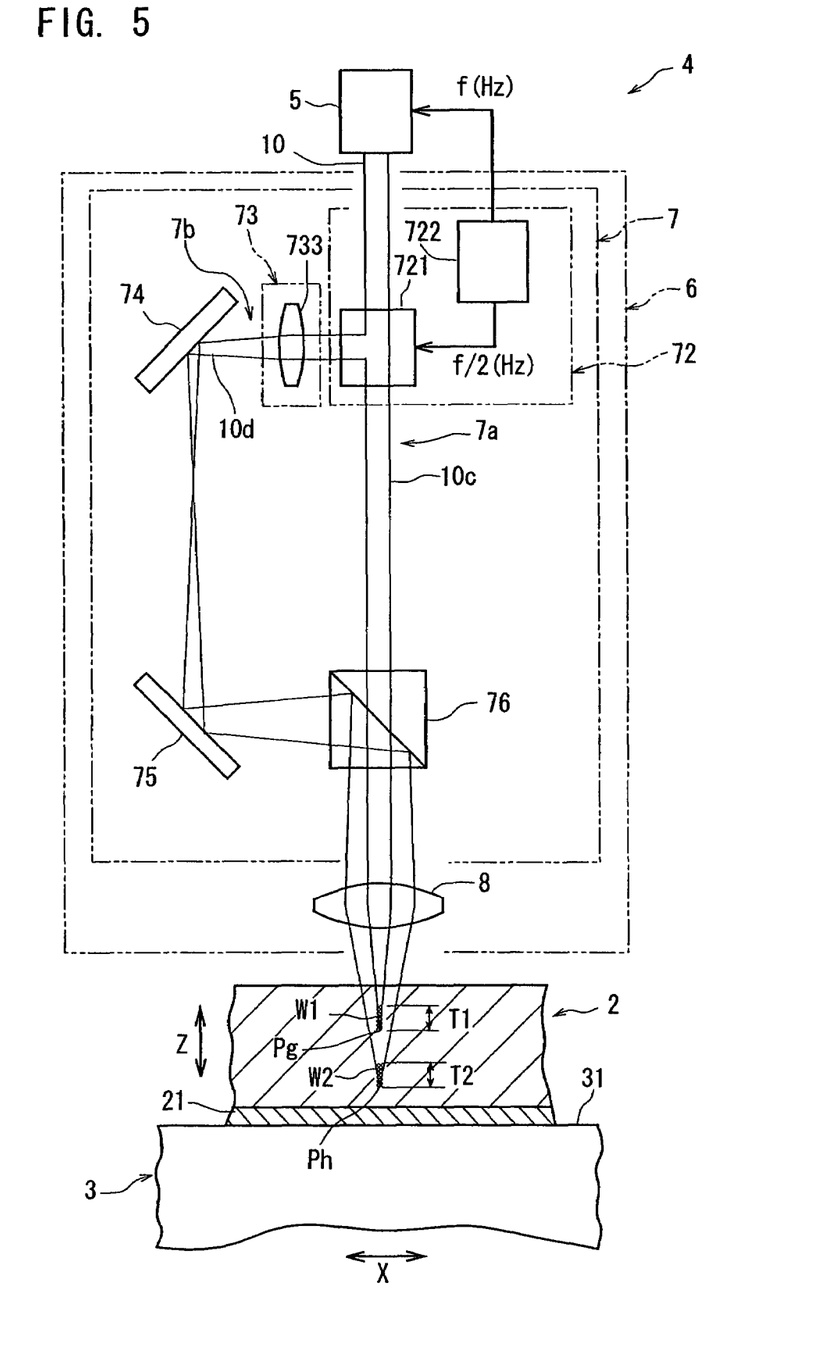
FIG. 5 is a schematic constitution diagram of a fourth embodiment of the laser beam processing machine constituted according to the present invention.

The laser beam application means 4 shown in FIG. 5 differs from the laser beam application means 4 shown in FIG. 4 in that the focusing point depth displacing means 73 is arranged in the second path 7b. This focusing point depth displacing means 73 is composed of one convex lens 733 and is interposed between the modulator 721 and the first mirror 74, like the focusing point depth displacing means 73 of the second embodiment. Since the constitution of the laser beam application means 4 shown in FIG. 5 is substantially identical to that of the laser beam application means 4 shown in FIG. 4 except for the focusing point depth displacing means 73, the same members are given the same reference symbols and their descriptions are omitted.

In the laser beam application means 4 shown in FIG. 5, the first laser beam 10c divided by the modulator 721 goes straight to the first path 7a, passes through the beam splitter 76 and is converged at a focusing point Pg in the inside of the wafer 2 as the workpiece by the condensing lens 8, like the laser beam application means 4 shown in FIG. 4. This focusing point Pg corresponds to the focusing point Pf of the second laser beam 10d in the laser beam application means 4 shown in FIG. 4.

Meanwhile, the second laser beam 10d branched off to the second path 7b by the modulator 721 of the path distribution means 72 passes through the convex lens 733 as the focusing point depth displacing means 73 to change its beam divergent angle. In the illustrated embodiment, the divergent angle of the second laser beam 10d is gradually reduced by passing through the convex lens 733 so that its diameter gradually becomes smaller as it becomes farther away from the convex lens 733. The second laser beam 10d whose beam divergent angle has been changed by passing through the convex lens 733 is reflected by the first mirror 74, the second mirror 75 and the beam splitter 76 at angles corresponding to their installation angles, and its optical axis is aligned with the optical axis of the first laser beam 10c passing through the above first path 7a. Since the beam divergent angle of the second laser beam 10d incident on the condensing lens 8 has been changed by passing through the convex lens 733 as the focusing point depth displacing means 73, its beam diameter has also been changed. The second laser beam 10d passing through the condensing lens 8 is converged at a focusing point Ph in the inside of the wafer 2 as the workpiece. Since the second laser beam 10d passing through the second path 7b is converged by the condensing lens 8 in a state where its beam diameter is gradually increased by passing through the focusing point depth displacing means 73, its focusing point Ph is located at a position (lower position in FIG. 5) deeper than the focusing point Pg of the first laser beam 10c passing through the first path 7a, that is, at a position away from the condensing lens 8 in the direction of the optical axis. The depth of the focusing point Ph can be suitably adjusted by moving the convex lens 733 as the focusing point depth displacing means 73 in the horizontal direction. Also in the embodiment shown in FIG. 5, as the first laser beam 10c and the second laser beam 10d are output alternately by the above modulator 721, they are converged in the inside of the wafer 2 as the workpiece with a time lag between them. Therefore, the first laser beam 10c and the second laser beam 10d do not interfere with each other, and the second laser beam 10d having a deep focusing point is not obstructed by the first laser beam 10c having a shallow focusing point. As a result, deteriorated layers W1 and W2 having desired thicknesses T1 and T2 can be formed near the focusing point Pg of the first laser beam 10c and near the focusing point Ph of the second laser beam 10d, respectively.

A description is subsequently given of another embodiment of the focusing point depth displacing means 73 with reference to FIG. 6.

Figure 6:
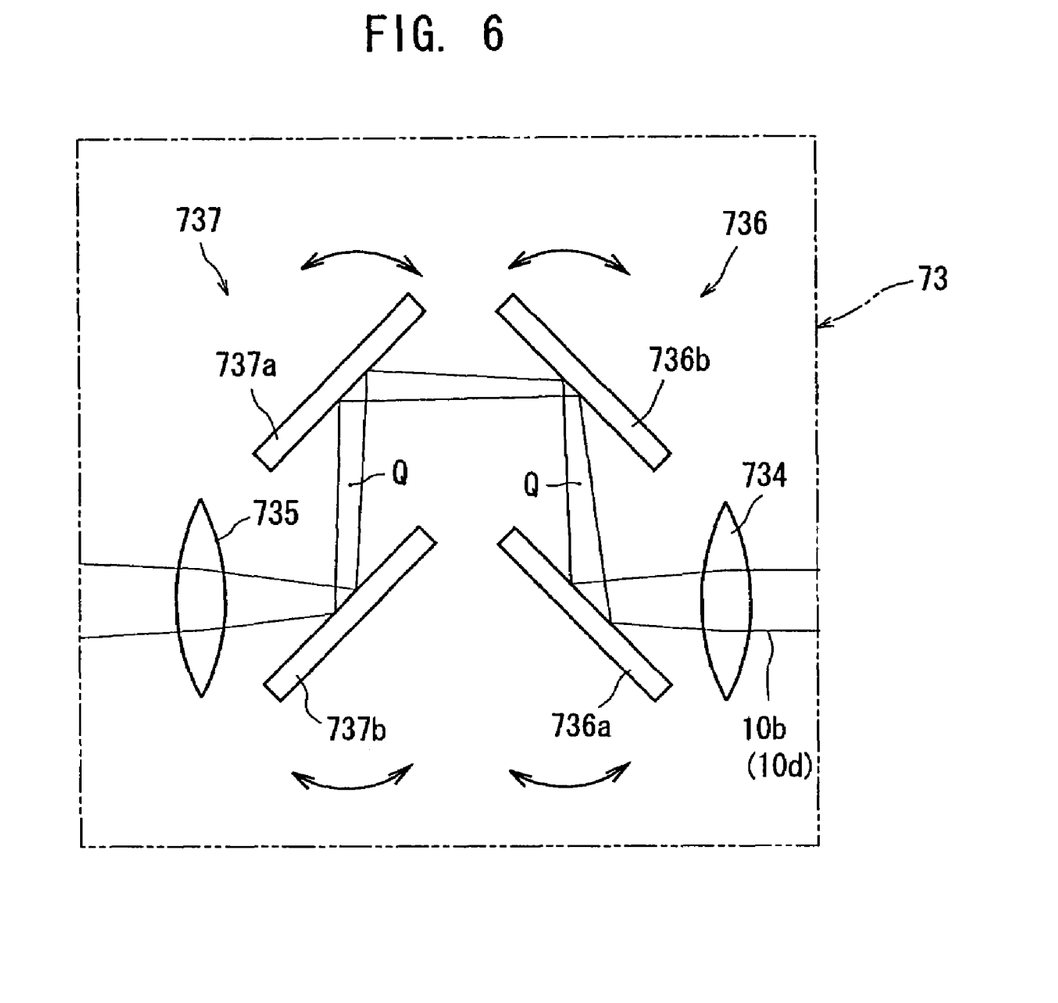
FIG. 6 is a schematic constitution diagram showing another embodiment of a focusing point depth displacing means provided in the laser beam processing machine constituted according to the present invention.

The focusing point depth displacing means 73 shown in FIG. 6 comprises a convex lens 734 and a convex lens 735 which are spaced apart from each other, and a first pair of mirrors 736 and a second pair of mirrors 737, which are interposed between the convex lens 734 and the convex lens 735. The first pair of mirrors 736 consist of a first mirror 736a and a second mirror 736b which are parallel to each other and fixed to a mirror holding member (not shown) in a state where they keep spacing therebetween. The second pair of mirrors 737 consist of a first mirror 737a and a second mirror 737b which also are parallel to each other and fixed on a mirror holding member (not shown) in a state where they keep spacing therebetween. In the focusing point depth displacing means 73 that is constituted as described above and shown in FIG. 6, when the horizontally polarized laser beam 10b or the second laser beam 10d which has branched off to the second path 7b, passes through the convex lens 734, the first mirror 736a and the second mirror 736b of the first pair of mirrors 736, the first mirror 737a and the second mirror 737b of the second pair of mirrors 737, and the convex lens 735, the divergent angle of the horizontally polarized laser beam 10b or the second laser beam 10d is so constituted as to increase so that its beam diameter gradually becomes larger as it becomes farther away from the convex lens 735. The divergent angle of the horizontally polarized laser beam 10b or the second pulse laser beam 10d and its beam diameter when it is incident on the above condensing lens 8, that is, the depth position of the focusing point of the horizontally polarized laser beam 10b or the second pulse laser beam 10d, which passes through the focusing point depth displacing means 73 and is converged by the above condensing lens 8, can be suitably adjusted by changing the length of the optical path by varying the installation angles of the first pair of mirrors 736 and the second pair of mirrors 737. For the adjustment of the installation angles, the mirror holding members (not shown) for holding the first pair of mirrors 736 and the second pair of mirrors 737 are turned on a point Q where the first mirror 736a and the first mirror 737a become point symmetrical to the secondmirror 736 band the secondmirror 737b, respectively. The above focusing point depth displacing means 73 may be interposed between the first mirror 74 and the second mirror 75 in the above embodiments or may be arranged in the first path 7a.

While the present invention has been described above based on the illustrated embodiments with reference to the accompanying drawings, it should be noted that the present invention is in no way limited to the above embodiments only but can be changed or modified in other various ways without departing from the scope of the present invention. For example, in the illustrated embodiments, the convex lens is used as the focusing point depth displacing means. The lens as the focusing point depth displacing means may be a concave lens or a set of lenses.

What is claimed is:

1. A laser beam processing method of forming deteriorated regions in a wafer along a dividing line, comprising the steps of:

holding a wafer on a chuck;

producing a pulse laser beam capable of passing through the wafer;

transmitting the pulse laser beam to a path distribution means;

dividing the pulse laser beam by the path distribution means into a first pulse laser beam and a second pulse laser beam;

distributing the first pulse laser beam to a first path and the second pulse laser beam to a second path by the path distribution means;

applying the first pulse laser beam and the second pulse laser beam to the wafer in such a manner that a focusing point of the first pulse laser beam and a focusing point of the second laser beam are moved along the dividing line to form deteriorated regions in the wafer along the dividing line and in such a manner that the first pulse laser beam and the second pulse laser beam are applied to the wafer alternately with a time lag therebetween; and displacing the focusing point of one of the first pulse laser beam and the second pulse laser beam so that the focusing points of the first and second pulse laser beams are displaced from each other in the wafer, in the direction of thickness of the wafer.

2. The laser beam processing method according to claim 1, wherein the first pulse laser beam is vertically polarized laser light and the second pulse laser beam is horizontally polarized laser light.

3. The laser beam processing method according to claim 1, wherein the deteriorated regions in the wafer along the dividing line are formed in two thickness areas displaced from each other in the direction of thickness of the wafer.

4. The laser beam processing method according to claim 1, wherein the first and second pulse laser beams are applied such that after a pulse of one of the first and second pulse laser beams comes, a pulse of the other of the first and second pulse laser beams comes.

5. The laser beam processing method according to claim 1, wherein the first and second pulse laser beams are applied in such that after two pulses of one of the first and second pulse laser beams come, two pulses of the other of the first and second pulse laser beams come.

6. The laser beam processing method according to claim 1, wherein the step of displacing the focusing point of one of the first pulse laser beam and the second pulse laser beam is carried out by a lens.

* * * * *